May 5, 1936.  A. LEIB ET AL  2,039,812
SIGNALING SYSTEM
Filed Nov. 18, 1930  3 Sheets-Sheet 1

INVENTORS
AUGUST LEIB
HANS SCHARLAU
BY
ATTORNEY

May 5, 1936.  A. LEIB ET AL  2,039,812
SIGNALING SYSTEM
Filed Nov. 18, 1930   3 Sheets-Sheet 2

INVENTORS
AUGUST LEIB
HANS SCHARLAU
BY
ATTORNEY

May 5, 1936.  A. LEIB ET AL  2,039,812
SIGNALING SYSTEM
Filed Nov. 18, 1930  3 Sheets-Sheet 3
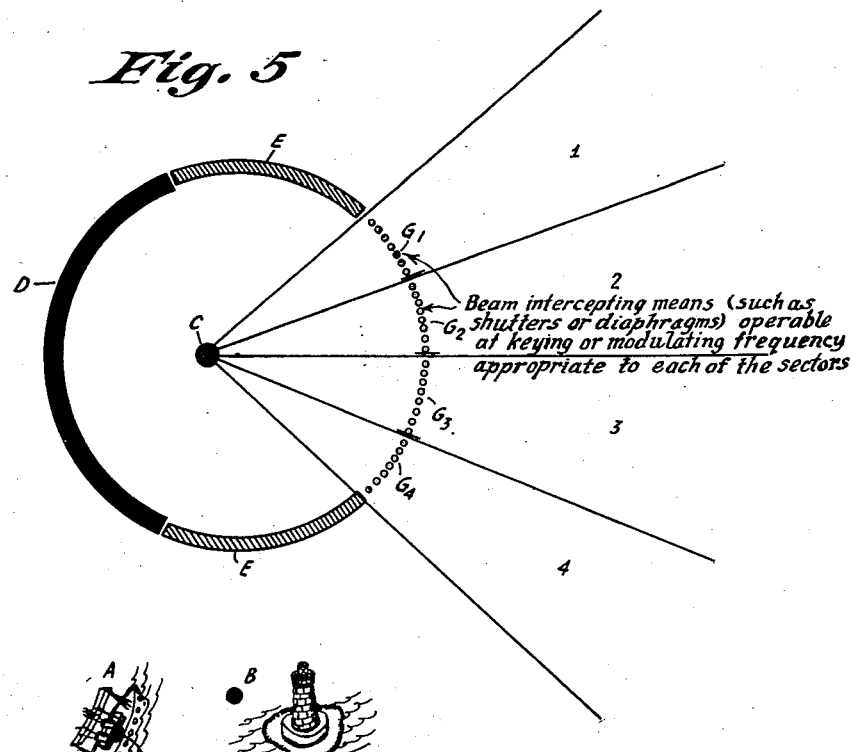
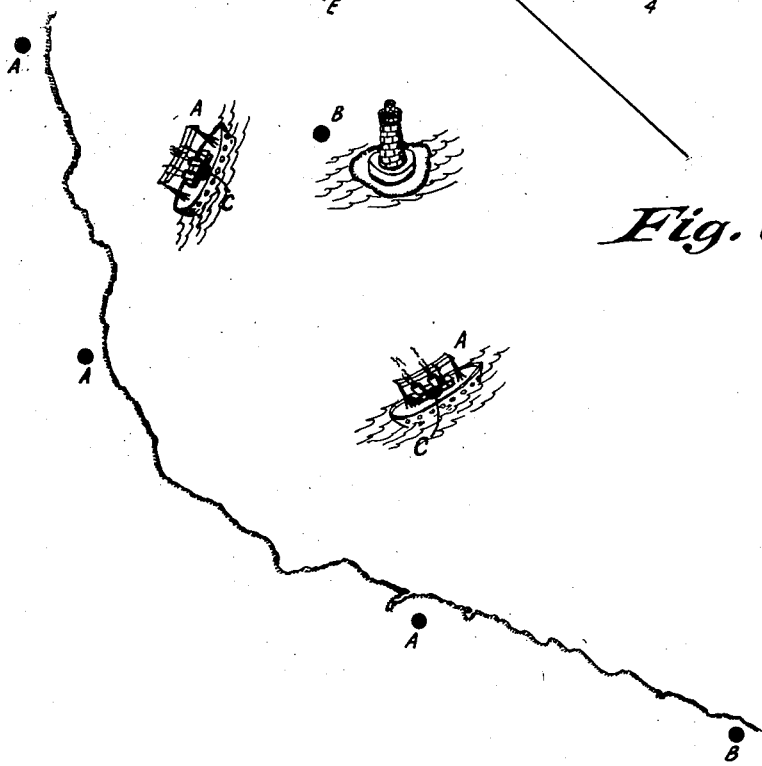
INVENTORS
AUGUST LEIB
HANS SCHARLAU
BY
ATTORNEY Patented May 5, 1936

2,039,812

UNITED STATES PATENT OFFICE 2,039,812

SIGNALING SYSTEM

August Leib and Hans Scharlau, Berlin, Germany, assignors to Telefunken Gesellschaft für Drahtlose Telegraphie m. b. H., Berlin, Germany, a corporation of Germany Application November 18, 1930, Serial No. 496,390
In Germany December 3, 1929

6 Claims. (Cl. 250—11)

It is known in the prior art that, for the purpose of increasing the volume received at a given place and in certain districts in the practice of radio communication, recourse may be had to directional sending and reception. Such directional communication work is carried into effect by an arrangement in which radiator transmitters and beam receivers are disposed in the foci of suitably constructed reflectors. But with these known beams or unidirectional radiators it is not feasible to properly mark or bound a given traffic lane since a vessel that happens to be located in the beam, on reaching the marginal portions or the beam, is practically unable to determine by the aid of its receiver apparatus whether it is located on the right-hand or the left-hand edge of the beam or of the traffic lane. The beam sender moreover allows of no clues as to the middle of the traffic lane or the beam, a fact which in many instances must be ascertainable for the proper separation of the outgoing and incoming traffic.

Now, according to the present invention this difficulty is avoided by the use of a novel signal system. This system is provided with transmitter arrangements for aerial and marine navigation. The transmitter projects a beam of infrared rays or ultra-short electromagnetic waves. More specifically a plurality of different but contiguous beams is sent out in fixed directions, these beams being distinguishable one from another upon reception at any receiving station either by the time of transmission of keyed impulses, or by the carrier frequency utilized, or by the modulation of the carrier frequency, or by other modes of differentiation. The most essential features of the invention will now be explained by reference to the accompanying drawings, in which:

Figures 1, 2, 3 and 5 show diagrammatically signaling systems for marking out courses for aerial and marine navigation;

Figure 6 illustrates the manner in which our novel signaling system may be applied to guide vessels.

Figure 1:
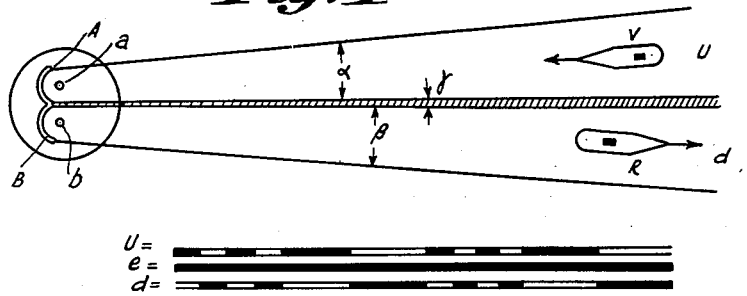

Referring to the embodiment shown in Figure 1, L denotes a lighthouse upon which are mounted two beam transmitters comprising the radiators $a$ and $b$ disposed in the foci of reflectors A and B. Radiator $a$ gives off the beam $\alpha$ and the radiator $b$ the beam $\beta$. The two sectors $\beta$ and $\alpha$ overlap in a narrow zone $\gamma$. The horizontal opening of the angles $\alpha$, $\beta$, $\gamma$ must be adapted to the particular case of traffic and the nature of the shipping lane concerned. Under certain circumstances, where long and narrow lanes are dealt with, the beams may approach the form of parallel strips or channels. The vertical opening of the angle is adapted to the nature of the traffic; for instance, for navigation the beam effect or bunching of the radiations must be kept as narrow as possible for the purpose of insuring great energy concentration for great distances. What has been assumed in the present instance is that the two beams $\alpha$ and $\beta$ are radiated on the same carrier frequency and the same modulation, but with different identification marks or call letters; for instance, the beam or bunch $\alpha$ is sent out at the rhythm of the Morse letter $u$, and the beam $\beta$ at the rhythm of the Morse signal $d$, both signals being given off by a joint signal-transmitter outfit in such time relation that the spaces of one signal will coincide with the signals of the other. Inside the overlap zone the two signals become added inasmuch as they bear a complementary relationship to each other, thus resulting in a long dash. The signal transmitter outfit may effect the call letters or identification marks by positively acting means by the keying of working currents or movement of the radiators and/or reflectors and/or diaphragms. The signal $u$ perceived by the vessel V may correspond, for instance, to the direction of travel towards the lighthouse, while the signals $d$ received or picked up by the vessel R may correspond to the contrary sense of travel. Whenever the long dash comes in, this means that the vessel is located inside the middle of the lane which it should shun.

The use of two complementary Morse signals is fundamentally known in the prior art, indeed, it has already been used in practice in connection with long-wave transmitters working without sharply bounded sectors or beams. However, in these prior schemes the dash resulting from the two signals is the directrix to merely characterize the traffic lane, so that traffic going to and fro has experienced occasional collisions where transmitters of this kind have been used. This old system working with long-wave beacon transmitters, apart from a great number of other drawbacks, does not operate entirely independently of disturbing stray directrices, the following of which is liable to run a vessel off its course. Another fact is that these long-wave transmitters do not merely sweep the district or space on which traffic is to be regulated, but also all other spaces, and the result is an unnecessarily high expenditure of energy together with disturbances to neighboring organizations of a similar kind and radio work proceeding in the spaces thus affected.

Figure 2:
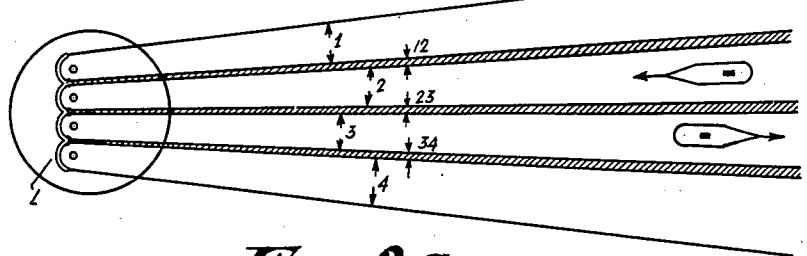
Figure 2A:
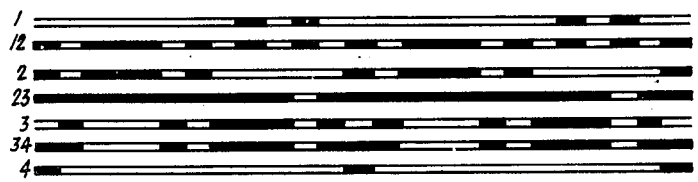
Figure 2a illustrates the transmission characteristics of the system of Figure 2.

In the embodiment of the invention shown in Figure 2, four radiators of the same carrier-wave are mounted upon the lighthouse L to which correspond the sectors 1—4. Between these are the narrow overlap zones 12, 23, 34. Sector 2 forms the lane for the direction of travel towards the lighthouse, sector 3 the lane going in the opposite direction. Sectors 1 and 4 are what may be called the "caution" or "warning" sectors. The signals corresponding and coordinated to the various sectors are indicated in Figure 2a. For instance, Morse-code letter r stands for the sector 2, and letter l for the sector 3 for travel in the opposite direction of travel. In the central overlap zone 23 these signals become added to each other resulting in long dashes. The signal for the caution sector 1 is the letter i or two dots. The combined dots and dashes of the two letters r and i may be observed in the overlap zone 12, giving the signal —.. — .. —. The caution sector 4 consists of separated individual dots which together with call letter l for the main sector 3 produce within the overlap zone 34 the characteristic signal. — —.

This transmitter arrangement affords safe guiding no matter what the weather conditions, and is particularly suitable for narrow lanes bearing heavy traffic.

Instead of differentiating the different sectors by different call letters or identification signals as shown in the foregoing example, it would also be feasible to coordinate thereto different modulation frequencies for identification, for one and the same carrier wave. In the receiver apparatus of the system, for each modulation frequency, an indicator responding to each one thereof may be provided. These indicator devices, for instance, may consist of frequency-meters of the tuned reed or vibrator type, tuned galvanometers, resonance relays or resonant circuits equipped with special indicators. Similar apparatus known in the art may be used, adapted to respond to the modulation frequencies and to their intensities.

Figure 3:
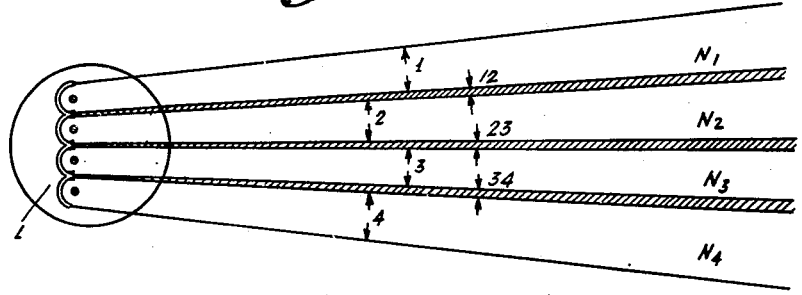
Figure 3A:
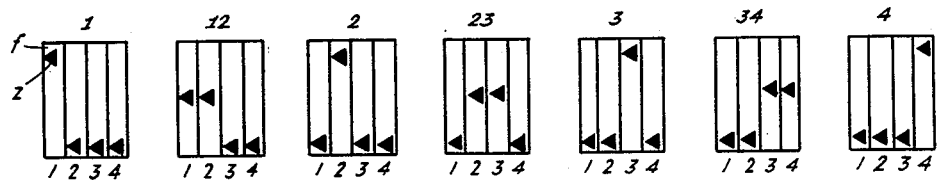
Figure 3a illustrates the manner in which the signals transmitted by the system of Figure 3 may be indicated at the receiver.

Figure 3 shows an embodiment comprising a sector scheme similar to Figure 2. Also in this case the outer sectors 1 and 4 are for caution, sectors 2 and 3 the travelling lanes, i. e., 2 for travel towards the transmitter, and 3 for travel in the contrary sense. To these sectors are coordinated the modulation frequencies N1—N4, while all of them work on the same carrier wave. Figure 3a shows different pictures or signals in the window of a receiving indicator f giving what is visible for the various sectors. Windows 1, 2, 3, 4, of the indicator apparatus are coordinated to the modulation frequencies of sectors 1—4. In the sector 1 the indicator Z is deflected in frame 1. Inside the overlap sector 12 the indicators 1 and 2 are deflected, and so on.

Figure 4:
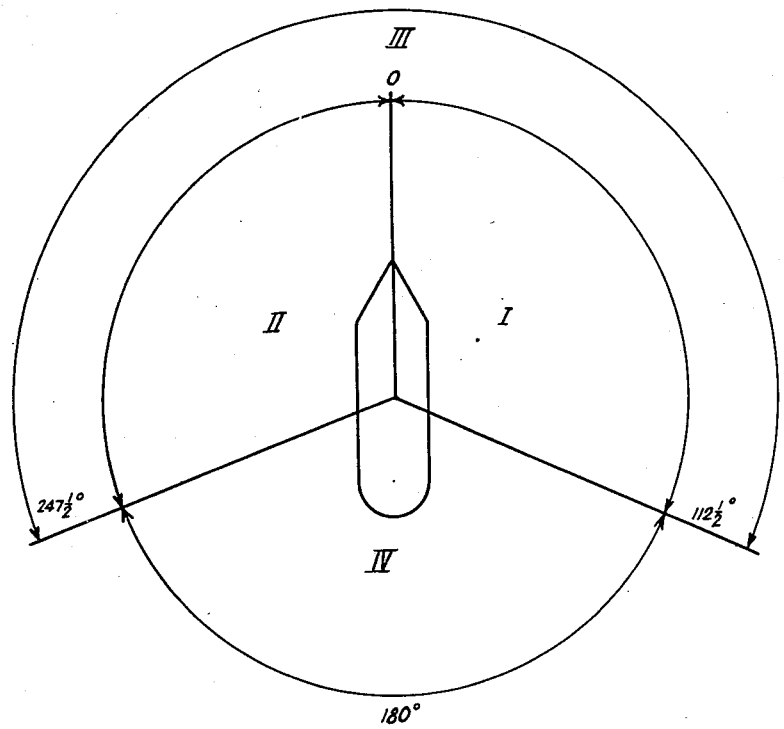
Figure 4 shows a method of radiating identifying rays from a vessel.

The same system could be used also for the purpose of avoiding ship collisions by mounting the transmitters capable of radiating beams on board ships. In this case the opening angle of the sectors and their orientations relatively to the vessel are preferably chosen similar to the navigation lights on the ship. Such an arrangement is shown schematically in Figure 4. For instance, the following sectors I-IV may be radiated:

I for the opening angle between 0 and 112½ degrees
II for the opening angle between 0 to 247½ degrees
III for the opening angle between 247½ over 0–112½ degrees
IV for the opening angle between 112½ over 180–247½ degrees where 0 degree corresponds to travel "straight ahead", and the angular figures in the usual way in clockwise direction.

The different sectors I-IV are given separate identification signals or modulation frequencies, thus I (identification or modulation A) corresponding to green light
II (identification or modulation B) corresponding to red light
III and IV (identification or modulation C) corresponding to white light.

If desired, sectors III and IV may be replaced by the radiation from a single circular radiator.

If the sectors are to be identified or characterized by different modulation frequencies, on the same carrier wave, it is best to mark the receiving indicators for insurance against collision with the corresponding colors of the ship's navigation lights, for instance, by the colors green, red, white and/or by lettering.

For beam radiators transmitting several sectors, each radiator being fed from a separate source, it may happen that, for instance, owing to undesirable energy fluctuations of the different sources of rays, the intensities of the different sectors may change in relation to one another. As a result the identification lines of like intensity inside the overlap zones would be shifted, and this may become a source of danger in narrow lanes of travel. Now, this inconvenience may be avoided by using one and the same source of radiation for all of the sectors comprised in a given equipment. A case of this kind is shown, for example, in Figure 5. C denotes the joint radiator for the sectors 1—4, D a reflector, E side screens for bounding the over-all angle of opening, G1—G4 controllable diaphragms which are operated, for instance, at the rhythm of the modulation frequencies or at the rhythm of the call letters or identification signals, is desired, in the form of Morse-code letters. The diaphragms G1 to G4 may take any appropriate form as long as they serve the purpose of modulating or keying the beams sent out in the different sectors into which the wave from the signal source C is divided.

To prevent disturbance or failure in the transmission of the signals sent out it is advisable to provide at the point of transmission or at some convenient central point whence a plurality of radiators are actuated, a control or check-up device indicating the proper working of the radiator equipment as well as the modulation and the signaling. With this end in view, inside several sectors, a number of stationary receivers may be mounted whose indicators are mounted either at the transmitter itself or else at the said central place. If control of all transmitters is effected from one central place, connection between the "supervisor" receivers mounted in the path of the various beam sectors and the indicators located at the central point may be established by cables or similar transmitter means.

As marine and aerial navigation increases in use means for the guiding and the safeguarding of craft increase also and electromagnetic waves as well as aerial and subaqueous sound waves are regularly sent out from a great number of points on the mainland and along the coast. These waves are received by suitable apparatus mounted on shipboard and on aircraft and are used for the piloting of marine and aircraft. By the aid of these means it has become feasible to guide vessels along open lanes of travel safely as far as the very port or the pier. In proportion as further progress has been made along scientific lines and by practical experience in the field of short waves and infra-red rays it has become possible to utilize these in the practice of marine and aerial navigation and similar forms of traffic in order to render these in the future wholly independent of all kinds of atmospheric conditions. Now, if the different branches of such safety service were to develop unsystematically the danger may arise that different equipment is built for these different branches which, though having all one common purpose, employ different carrier waves and different receiver outfits. The introduction of these various means would mean great extra financial burdens for traffic which, beside, would be out of proportion to the realized results; and such extra cost could not be borne by small sized vessels which are really most dependent upon safeguards by signaling systems. The practical result would be that the branches of the new safety system most important from a viewpoint of economy and safety would fail of being introduced.

Now, according to another phase of the present invention the above drawbacks are obviated in this manner: for the various branches of safety service which operate with beams or waves directed along a certain sector and with radiations, a uniform or standard frequency useful under all circumstances is chosen, and the vessels are fitted with only one receiver for all purposes of safety service.

The requisite freedom from disturbance and differentiation for the different fields of safety service is insured, on the one hand, by sharp concentration of the beams by the aid of suitable reflectors as disclosed hereinbefore, and, on the other hand, by the employment of a uniform or standard carrier frequency which is differently modulated to serve the different problems to be solved.

For example, in the present invention the system installed for navigation, especially for travel in coastal waters, rivers, and lakes, would involve a plurality of stations (see A Figure 6) and the use at each A station of a standard frequency voice modulated. Water vessels would thus have the chance to carry on intercommunication in a very effective and undisturbed manner by directional telephony in lieu of the customary megaphone. The vessels may also ascertain their positions from the land stations of the A type.

In addition, for longer open sea trips, transmitter equipment is installed (see B stations of Figure 6) near beacon lights and lighthouses. This equipment is adapted to send out inside certain sectors radiations having the same carrier frequencies as the voice transmitters at the A stations. The carrier wave of these transmitters is subjected to acoustic modulation and characterizing identification signals, and in this case the modulation frequency would have to take the place of the particular character or the colors of the light. Vessels could pick up the radiations of such transmitters with the receiver apparatus forming part and parcel of their telephone equipment. Since the telephone receiver apparatus, for bunched or beam radiations, is directional in nature, it will be seen that thus also the direction of these transmitters could be ascertained. Intelligence by the voice would not be disturbed thereby, since vocal communication would remain intelligible even though accompanied by a single note of a guide signal, and since the radiation senses for the voice and for the guide signals will in most cases not be the same.

The same system could be further developed so as to become an effective means to preclude ship collisions. The transmitter equipment required for this purpose is to be mounted directly on board the vessels so as to be safeguarded (see C stations of Figure 6). While having the same carrier wave, they would be distinguished from other transmitter outfits by a difference in modulation. These transmitters may be nondirective or may transmit a beam over a narrow path along the direction the ship is travelling to warn ships in that path. Bearer transmitters, as disclosed hereinbefore, may be used. Instead of the colors white, red and green customarily used for navigation signals, there could be used, for instance, three comparatively low frequencies so that they can be brought to act upon the reed or vibrator type frequency indicator or meter. Clear audible or earphone reception would then afford clear differentiation between the voice, between note-modulated trip guide transmitter, and the transmitters installed on board ship to prevent collisions and working with low frequencies. A vessel in motion, when picking up a transmitter, will be readily able to distinguish between the main groups of such transmitters, i. e., for telephonic communication, and guide signal transmission, either from stationary or mobile transmitters.

In order that an observer with a less trained ear may be enabled to distinguish more readily, especially for low frequencies, a frequency indicator should be provided most suitably for each important modulation frequency, in addition to audible reception means, so that combinedly with the latter safe and reliable perception and distinction may be feasible. Each of the stations A, B, and C include a receiver responsive to all signals transmitted by stations A, B, and C.

The whole system affords the security that, with a minimum of means and cost together with simplicity of operation on shipboard, a maximum of safety is insured for the vessels.

Having thus described our invention and the operation thereof, what we claim is:

1. A beacon system comprising means for continuously radiating high frequency energy, a reflector associated therewith and adapted to concentrate said radiations in a beam directed in a predetermined direction, means for separating said beam of radiations into a plurality of smaller beams, and means for modulating each of said last named beams at a different characteristic signal frequency.

2. Apparatus, as claimed in claim 1, including means for limiting the total width of the radiated beam.

3. A beacon system comprising, means for continuously generating and for continuously radiating high frequency energy, a reflector located adjacent said radiating means to direct the energy radiated thereby in a predetermined direction, auxiliary deflecting means mounted adjacent said radiating means to further direct the energy radiated therefrom, and means for separating said radiant energy into a plurality of separate beams and superimposing on said beams modulations at signal frequency comprising a plurality of controllable diaphragms mounted adjacent said radiating means in the path of said radiations.

4. A beacon system comprising, means for continuously radiating high frequency energy, a device directing said energy in a predetermined direction, means for separating said directed energy into a plurality of separate beams, and superimposing on said beams modulations at signal frequency comprising, a plurality of controllable diaphragms in the path of said radiations, there being a diaphragm for each beam, each diaphragm being operable at different modulating frequencies or at different keying frequencies.

5. In a beacon system, means for radiating high frequency energy, a device associated with said radiating means for directing said energy in a predetermined direction, and a plurality of controllable diaphragms in the path of said directed energy, each diaphragm being operable at a different keying frequency whereby said energy marks out a plurality of paths each identified by a particular keying characteristic of the energy.

6. In a beacon system, means for radiating high frequency energy, an energy directive device for producing beams of said energy in different sectors, means for intercepting said beams intermittently in different sectors, and keying means operable upon said intercepting means whereby the energy is characteristically key-modulated in a distinguishable manner for each sector.

AUGUST LEIB.
HANS SCHARLAU.